US010957342B2

(12) United States Patent
Reed et al.

(10) Patent No.: US 10,957,342 B2
(45) Date of Patent: Mar. 23, 2021

(54) NOISE CANCELLATION

(71) Applicant: Cirrus Logic International Semiconductor Ltd., Edinburgh (GB)

(72) Inventors: Kieran Reed, Edinburgh (GB); Krishna Kongara, Edinburgh (GB); Aengus Westhead, Edinburgh (GB); Hock Lim, Edinburgh (GB)

(73) Assignee: Cirrus Logic, Inc., Austin, TX (US)

( * ) Notice: Subject to any disclaimer, the term of this patent is extended or adjusted under 35 U.S.C. 154(b) by 133 days.

(21) Appl. No.: 16/249,144

(22) Filed: Jan. 16, 2019

(65) Prior Publication Data
US 2020/0227073 A1 Jul. 16, 2020

(51) Int. Cl.
*G10L 21/0208* (2013.01)
*G10L 25/84* (2013.01)
*G10L 15/16* (2006.01)
*G10L 15/20* (2006.01)
*G10L 21/0216* (2013.01)

(52) U.S. Cl.
CPC .............. *G10L 25/84* (2013.01); *G10L 15/16* (2013.01); *G10L 21/0208* (2013.01); *G10L 15/20* (2013.01); *G10L 2021/02168* (2013.01)

(58) Field of Classification Search
CPC ..... G10L 25/84; G10L 15/16; G10L 21/0208; G10L 21/0264; G10L 15/20; G10L 2021/02168
See application file for complete search history.

(56) References Cited

U.S. PATENT DOCUMENTS

| | | | | |
|---|---|---|---|---|
| 5,583,968 A | * | 12/1996 | Trompf | G10L 15/20 704/232 |
| 6,459,914 B1 | * | 10/2002 | Gustafsson | G10L 21/0232 455/570 |
| 2001/0028713 A1 | * | 10/2001 | Walker | G10L 21/0208 379/416 |
| 2013/0054235 A1 | * | 2/2013 | Mozer | G10L 15/20 704/233 |

FOREIGN PATENT DOCUMENTS

WO    WO-2014160980 A1 * 10/2014    ....... H04L 25/03343

OTHER PUBLICATIONS

Ince, et al., "Multi-talker Speech Recognition under Ego-motion Noise using Missing Feature Theory," 2010 IEEE/RSJ Int. Conf. Intelligent Robots and Systems. (Year: 2010).*

* cited by examiner

Primary Examiner — Feng-Tzer Tzeng
(74) Attorney, Agent, or Firm — Jackson Walker L.L.P.

(57) ABSTRACT

An audio processing apparatus, comprising: a first receiver configured to receive one or more audio signals derived from one or more microphones, the one or more audio signals comprising a speech component received from a user and a first noise component transmitted by a first device; a second receiver configured to receive over a network and from the first device, first audio data corresponding to the first noise component; one or more processors configured to: remove the first noise component from the one or more audio signals using the first audio data to generate a first processed audio signal; and perform speech recognition on the first processed audio signal to generate a first speech result.

19 Claims, 12 Drawing Sheets

NOISE CANCELLATION

TECHNICAL FIELD

The present application relates to methods, apparatus and systems for cancellation of noise for automatic speech recognition.

BACKGROUND

Virtual assistants, such as Apple Siri®, Samsung Viv®, Amazon Alexa® or Google Now®, operate by monitoring an audio environment via one or more microphones for human speech and subsequently interpreting that human speech. In environments where interfering noise is present, making a determination that audio contains human speech, and subsequently interpreting that speech can become difficult. For example, in an environment in which audio is being played through a loud speaker, a virtual assistant might find it difficult to differentiate between the interfering noise from the loud speaker and the speech of a user trying to interact with the virtual assistant. Worse still, the interfering noise may completely drown out the speech of the target user.

It is desired to address or ameliorate one or more shortcomings of known noise cancellation techniques, or to at least provide a useful alternative thereto.

Any discussion of documents, acts, materials, devices, articles or the like which has been included in the present specification is not to be taken as an admission that any or all of these matters form part of the prior art base or were common general knowledge in the field relevant to the present disclosure as it existed before the priority date of each of the appended claims.

SUMMARY

Embodiments of the present disclosure aim to overcome or at least alleviate difficulties faced by a virtual assistant in interpreting a signal received from a user.

In some embodiments, a virtual assistant which is monitoring an audio environment can be made aware of audio signals being output to the audio environment by other, interconnected devices. Each interconnected device may pass a reference signal representative of the audio being output from that device to the virtual assistant (or a device upon which the virtual assistant is operating). The virtual assistant may then process the audio signal received at one or more associated microphones to remove audio noise (such as the reference signal), leaving the speech signal from a user trying to interact with the virtual assistant.

According to a first aspect, there is provided an audio processing apparatus, comprising: a first receiver configured to receive one or more audio signals derived from one or more microphones, the one or more audio signals comprising a speech component received from a user and a first noise component transmitted by a first device; a second receiver configured to receive over a network and from the first device, first audio data corresponding to the first noise component; one or more processors configured to: remove the first noise component from the one or more audio signals using the first audio data to generate a first processed audio signal; and perform speech recognition on the first processed audio signal to generate a first speech result.

The one or more audio signals may further comprise a second noise component transmitted by a second device. The receiver may be configured to receive over the network and from a second device, second audio data corresponding to the second noise component. The processor may be configured to remove the second noise component from the one or more audio signals using the second audio data to generate the first processed audio signal.

The processor may be configured to prioritise removal of one of the first noise component and the second noise component from the one or more audio signals. Prioritizing removal of one of the first audio component and the second audio component may comprise estimating an energy level of each of the first audio component and the second audio component. Prioritising removal of one of the first audio component and the second audio component may comprise estimating a correlation between the speech component and each of the first noise component and the second noise component.

The processor is may be configured to determine a first audio class of the first audio data; determine a technique for removing the first noise component based on the determined first audio class; and remove the first noise component from the one or more audio signals using the determined technique. The first audio class may comprise one of the following: a) speech; b) music; c) engine noise; d) noise statistics for the first device.

The processor may be configured to: determine a second audio class of the second audio data; and prioritise removal of one of the first noise component and the second noise component from the one or more audio signals based on the determined first and second audio class.

The one or more processors may be further configured to time synchronise the one or more audio signals with the first audio data.

The second receiver may be configured to receive the first audio data over near field magnetic induction (NFMI) or Bluetooth®.

The at least one microphone may comprise two or more microphones. The one or more audio signals may comprise two or more audio signals. The one or more processors may be further configured to generate a plurality of spatially filtered audio signals using the two or more audio signals, each of the plurality of spatially filtered audio signals representing a spatial sector around the audio processing apparatus; identify the speech component in one of the spatially filtered audio signals; generate the first processed audio signal by removing the first noise component from the spatially filtered audio signal containing the speech component.

The one or more processors may be configured to: generate one or more additional processed audio signals by removing the first noise component from one or more spatially filtered audio signals representing one or more spatial sectors adjacent the spatially filtered audio signal containing the speech component; and perform speech recognition on the one or more additional processed audio signals to generate one or more confirmative speech results.

The audio processing apparatus may further comprise the one or more microphones.

The one or more processors may be configured to generate the first processed audio signal using a local neural network.

The one or more processors may be configured to train the local neural network using the first audio data and the one or more audio signals.

According to another aspect of the disclosure, there is provided an audio processing system comprising: the audio processing apparatus described above; and a remote neural network designer. The remote neural network may be configured to: remove the first noise component from the one or more audio signals using the first audio data to generate a second processed audio signal using a remote neural network; compare the first processed audio signal to the second processed audio signal; if the first processed audio signal to the second processed audio signal are different, retrain the local neural network using the first audio data and the one or more audio signals; and send the updated neural network to the audio processing apparatus.

According to another aspect of the disclosure, there is provided an audio processing system comprising: the audio processing apparatus described above; and a remote neural network designer. The remote neural network designer may be configured to: remove the first noise component from the one or more audio signals using the first audio data to generate a second processed audio signal using a remote neural network; perform speech recognition on the second processed audio signal to generate a second speech result; compare the first speech result with the second speech result; and if the first speech result with the second speech result are different: retrain the local neural network using the first audio data and the one or more audio signals; and send the updated neural network to the audio processing apparatus.

According to another aspect of the disclosure, there is provided an electronic device comprising the audio processing apparatus as described above.

The electronic device is one of a mobile phone, for example a smartphone; a media playback device, for example an audio player; or a mobile computing platform, for example a laptop or tablet computer.

According to another aspect of the disclosure, there is provided an audio processing method, comprising: receiving one or more audio signals derived from one or more microphones, the one or more audio signals comprising a speech component received from a user and a first noise component transmitted by a first device; receiving over a network and from the first device, first audio data corresponding to the first noise component; removing the first noise component from the one or more audio signals using the first audio data to generate a first processed audio signal; and performing speech recognition on the first processed audio signal to generate a first speech result.

The one or more audio signals may further comprises a second noise component transmitted by a second device. The method may further comprise: receiving over the network and from a second device, second audio data corresponding to the second noise component; and removing the second noise component from the one or more audio signals using the second audio data to generate the first processed audio signal.

The audio processing method may further comprise: prioritising removal of one of the first noise component and the second noise component from the one or more audio signals. Prioritizing removal of one of the first audio component and the second audio component may comprise estimating an energy level of each of the first audio component and the second audio component. Prioritising removal of one of the first audio component and the second audio component may comprise estimating a correlation between the speech component and each of the first noise component and the second noise component.

The audio processing method may further comprise: determining a first audio class of the first audio data; and determining a technique for removing the first noise component based on the determined first audio class; and removing the first noise component from the one or more audio signals using the determined technique.

The first audio class may comprise one of the following: a) speech; b) music; c) engine noise; d) noise statistics for the first device.

The audio processing method may further comprise: determining a second audio class of the second audio data; and prioritising removal of one of the first noise component and the second noise component from the one or more audio signals based on the determined first and second audio class.

The audio processing method may further comprise: time synchronise the one or more audio signals with the first audio data.

The second receiver may be configured to receive the first audio data over near field magnetic induction (NFMI) or Bluetooth®.

The at least one microphone may comprise two or more microphones. The one or more audio signals may comprise two or more audio signals. The method may further comprise: generating a plurality of spatially filtered audio signals using the two or more audio signals, each of the plurality of spatially filtered audio signals representing a spatial sector around the audio processing apparatus; identifying the speech component in one of the spatially filtered audio signals; and generating the first processed audio signal by removing the first noise component from the spatially filtered audio signal containing the speech component.

The audio processing method may further comprise: generating one or more additional processed audio signals by removing the first noise component from one or more spatially filtered audio signals representing one or more spatial sectors adjacent the spatially filtered audio signal containing the speech component; and performing speech recognition on the one or more additional processed audio signals to generate one or more confirmative speech results.

The audio processing method may further comprise: generating the first processed audio signal using a local neural network.

The audio processing method may further comprise: train the local neural network using the first audio data and the one or more audio signals.

The audio processing method may further comprise: at a remote neural network designer: removing the first noise component from the one or more audio signals using the first audio data to generate a second processed audio signal using a remote neural network; comparing the first processed audio signal to the second processed audio signal; and, if the first processed audio signal and the second processed audio signal are different: retrain the local neural network using the first audio data and the one or more audio signals.

The audio processing method may further comprise: at a remote neural network designer: removing the first noise component from the one or more audio signals using the first audio data to generate a second processed audio signal using a remote neural network; performing speech recognition on the second processed audio signal to generate a second speech result; comparing the first speech result with the second speech result; and, if the first speech result and the second speech result are different: retraining the local neural network using the first audio data and the one or more audio signals.

The remote neural network designer may be located in the cloud.

BRIEF DESCRIPTION OF DRAWINGS

By way of example only, embodiments are now described with reference to the accompanying drawings, in which.

DESCRIPTION OF EMBODIMENTS

Figure 1:
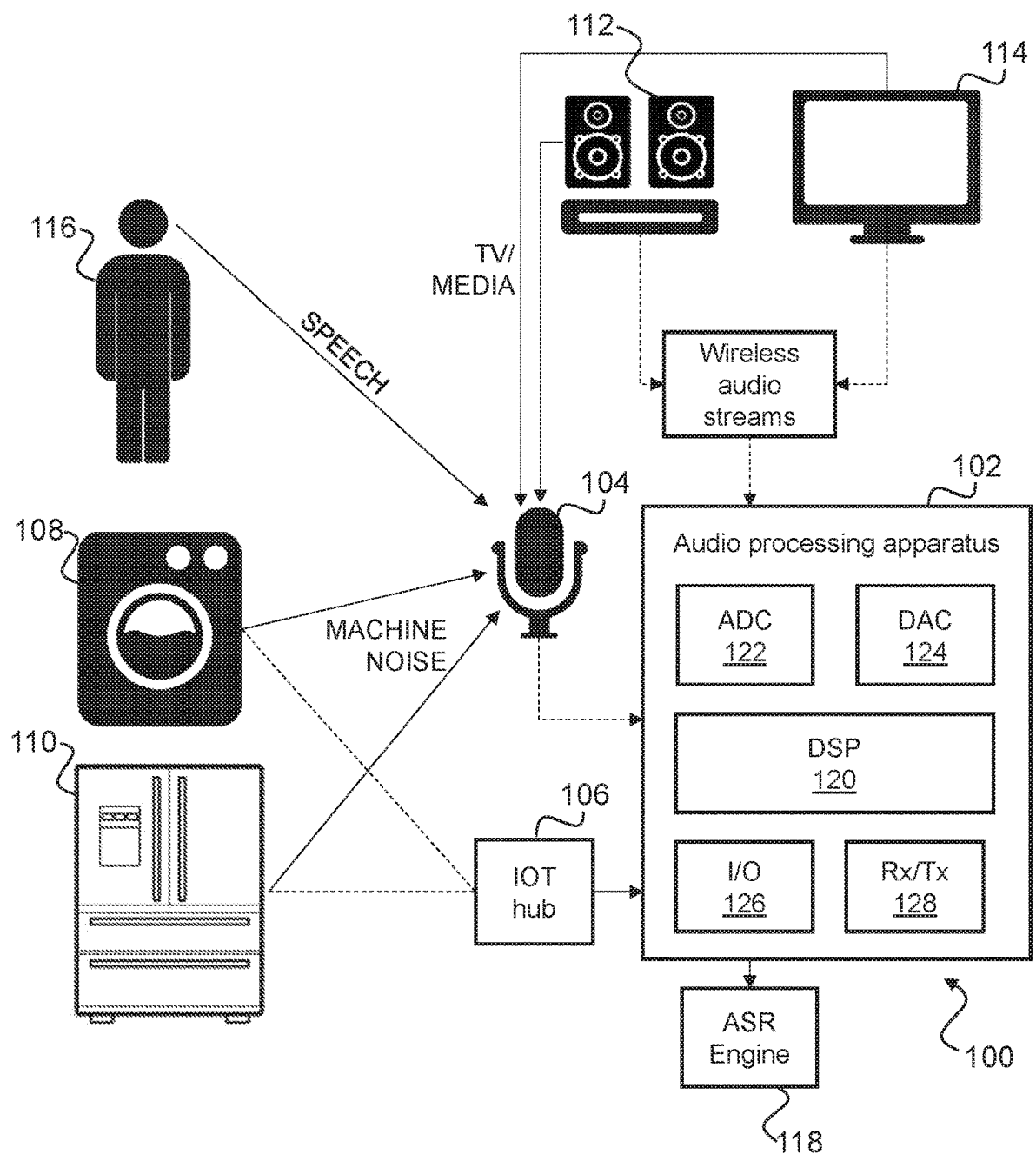
FIG. 1 is a schematic diagram of a smart home audio environment including an audio processing apparatus.

FIG. 1 is a schematic diagram of a smart home audio environment 100 according to embodiments of the present disclosure. The audio environment 100 comprises an audio processing apparatus 102, one or more microphones 104, IOT hub 106 (optional), and an automatic speech recognition (ASR) engine 118. Interconnected devices, such as a washing machine 108, a refrigerator 110, a media system 112, a TV 114, may also be present in addition to one or more users 116 of the audio environment 100.

The audio processing apparatus 102 may comprise a digital signal processor (DSP) 120 for processing digital signals as well as one or more analogue-to-digital converters (ADCs) 122, one or more digital-to-analogue converters (DACs) 124, and a digital and/or analogue input/output bus 126 for communicating input/output signals with various modules within the audio processing apparatus 102. The audio processing apparatus 102 may also comprise one or more transceivers 128 (wireless or wired) for communicating with interconnect wireless or wired devices, such as the washing machine 108, refrigerator 110, media system 112, or TV 114 depicted in FIG. 1. In some embodiments, the audio processing apparatus 102 may comprise a combined smart codec and audio DSP, for example a device from Cirrus Logic®, such as the CS47L35. The audio processing apparatus 102 may be configured to output a processed audio signal to the automatic speech recognition (ASR) engine 118, which in turn may be configured to process the audio signal to recognise speech in the audio signal, as is known in the art. In some embodiments, the ASR engine 118 may be integrated into the audio processing apparatus 102. The ASR engine 118 may form part of a virtual assistant.

The audio processing apparatus may be configured to receive data from one or more internet-of-things (IOT) enabled smart devices via the optional IOT hub 106. Functionality of the IOT hub 106 may be integrated into the audio processing apparatus 102. Exemplary smart devices include the smart washing machine 108 and the smart refrigerator 110 shown in FIG. 1. The audio processing apparatus 102 may also be configured to receive audio streams from one or more wireless devices media devices, such as the media system 112 and the television (TV) 114 shown in FIG. 1. The one or more microphones 104 may receive sound via acoustic paths from the user(s) 116, in the form of speech, as well as environmental sound from speakers of the media system 112 and the TV 114, and sound generated by the washing machine 108 and the refrigerator 110, for example sound generated by a motor of the washing machine 108 and a compressor of the refrigerator 110. It will be appreciated that these latter sounds from the media system 112, the TV 114 and the appliances 108, 110 can interfere with the speech received at the one or more microphones 104 from the user 116, which in turn reduces the likelihood of the ASR 118 from correctly interpreting speech in signals derived from the one or more microphones 104. For example. If the TV 114 is playing audio the ASR 118 may experience difficulty in determining the target signal (in this case the speech from the user 116). In embodiments of the present disclosure, this issue of interference is alleviated by transmitting data pertaining to the audio output from the TV 114 (and other devices) to the audio processing apparatus 102 so that the audio processing apparatus 102 knows the point source of each interfering signal which can then be removed for the purposes of speech recognition by the ASR 118.

The audio processing apparatus 102 may therefore be configured to process one or more audio signals derived from the one or more microphones 104 based signals received from one or more of the IOT devices 108, 110, the media system 112 and the TV 114. Specifically, the audio processing apparatus 102 may be configured to remove noise associated with one or more of these devices from the one or more audio signals derived from the one or more microphones 104 so that any speech received at the one or more microphones 104 from the user 116 can be more easily interpreted by the ASR engine 118. To do so, as mentioned above, each of the devices 108, 110, 112, 114 may transmit data to the audio processing apparatus 102 (as shown by broken lines in FIG. 1) relating to their audio footprint. With this information, the audio processing apparatus 102 is able to remove these audio footprints from the audio signals derived at the one or more microphones 104 whilst maintaining remaining ambient sound received at the one or microphones 104, such as speech 116 from the user.

Figure 2:
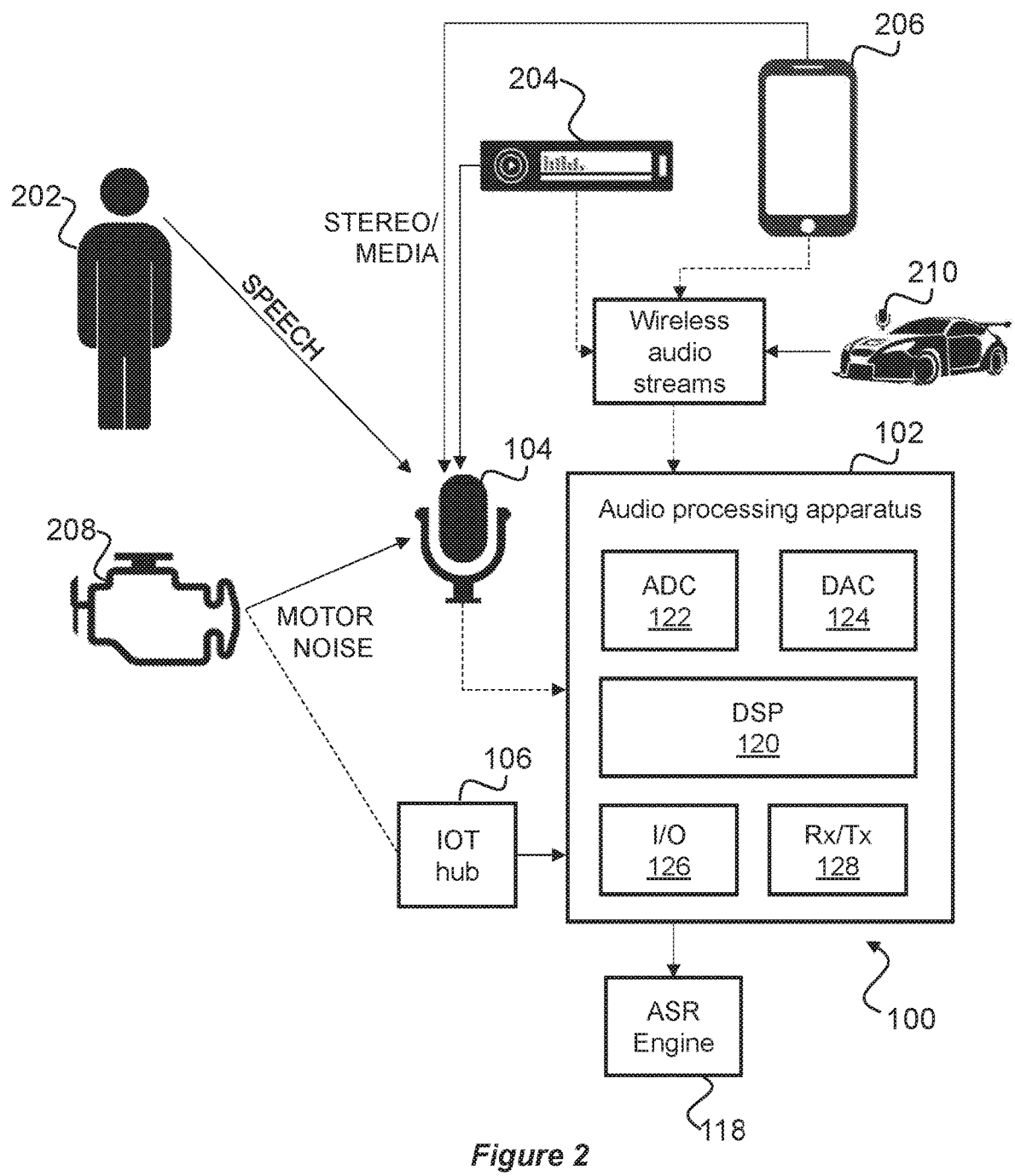
FIG. 2 is a schematic diagram of a smart car audio environment including the audio processing apparatus.

Embodiments of the present disclosure are not limited to home environments and can be employed in any environment in which interfering noise exists in combination with speech. FIG. 2 is a schematic diagram of an alternative smart environment; a smart car audio environment 200 according to embodiments of the present disclosure. Similar to the audio environment 100 of FIG. 1, the audio environment 100 comprises an audio processing apparatus 102, configured to receive one or more audio signals derived from one or more microphones 104, together with an ASR engine 118 and an optional IOT hub 106. In the smart car audio environment 200, the one or more microphones 105 may receive sound via acoustic paths from a user 202, such as the driver or passenger of a vehicle. The one or more microphones 104 may also receive sound from speakers of the media system 204, and one or more smart phones 206 paired or otherwise in communication with the audio processing apparatus 102, and sound generated by the engine 208 of the vehicle (electric, combustion or otherwise) and sound generated by a microphone 210 mounted external to the vehicle to pick up external noise. As with the smart home audio environment 100, in this environment 200 the audio processing apparatus 102 may be configured to process one or more audio signals derived from the one or more microphones 104 based signals received from one or more of the devices 204, 206, 208, 210. Specifically, the audio processing apparatus 102 may be configured to remove noise associated with one or more of these devices from the one or more audio signals derived from the one or more microphones 104 so that any speech received at the one or more microphones 104 from the user 202 can be more easily interpreted by the ASR engine 118.

Figure 3:
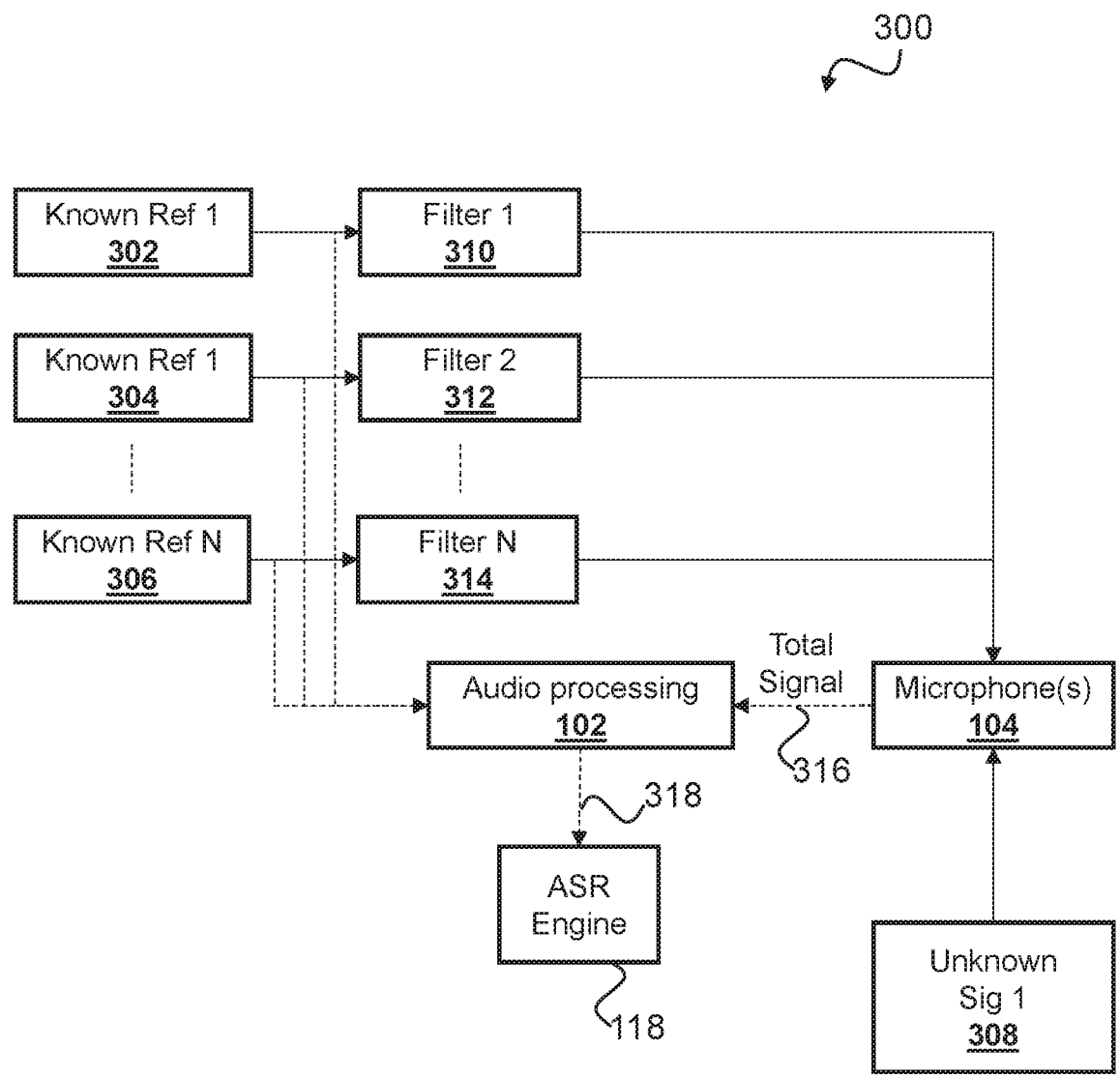
FIG. 3 is a block diagram showing signal and acoustic paths in relation to the audio processing apparatus.

FIG. 3 is a generalised block diagram 300 outlining the path of a plurality of known reference signals 302, 304, 306, such as those signals output from the devices 108, 110, 112, 114 shown in FIG. 1 and an unknown signal 308, such as speech from the user 116 shown in FIG. 1. The following description refers to the devices of FIG. 1 but the teaching can be applied equally to the smart car environment 200 shown in FIG. 2. Solid lines represent the acoustic paths of such signals, and broken lines represent the electronic path of signals to the audio processing apparatus 102. Filter blocks 310, 312, 314 represent the acoustic path from the point source of each device 108, 110, 112, 114 to the microphone 104, which may, for example, a speaker associated with a noise source and/or the physical audio space colouring associated with the acoustic environment.

Each of the known noise signals 302, 304, 306 are provided to the audio processing apparatus 102 along with audio signal 316 derived by the one or more microphones 104, herein after referred to as the total signal 316 or "TotalSignal". The total signal 316 may comprise a plurality of signals received from multiple microphones where two or more microphones 104 are connected to the audio processing apparatus 102.

According to FIG. 3, the total signal 316 may be defined by the following equations.

$$\text{TotalSignal} = \text{UnknownSig1} + \text{sum}(\text{KnownRef1}*\text{Filter1} + \ldots + \text{KnownRef}N*\text{Filter}N)$$

Thus, since each of the known reference signals 302, 304, 306 are provided to the audio processing apparatus 102, then an approximation of the unknown signal can be made. In some embodiments, the characteristics of the acoustic path for each of the known reference signals 302, 304, 306, as defined by filter blocks 310, 312, 314, may be determined. This determination may be made in a configuration stage. For example, each reference signal 302, 304, 306 during configuration, known reference signals 302, 304, 306 may be output with no other sources presented to the microphone(s) 104 to determine the difference between the signal derived from the one or more microphones 104 and the signal transmitted over the network. The filter may then be used to more closely match the known reference signals 302, 304, 306 received at the microphone(s) with the corresponding signals received over the network.

The known reference signals 302, 304, 306 transmitted to the audio processing apparatus 102 may include audio streams. Additionally or alternatively, known reference signals 302, 304, 306 may comprise any data relevant to determining the acoustic influence of each device on the signal derived from the one or more microphones 104. Such data may include, for example, noise statistics, noise characteristics, noise waveforms, device activity information (e.g. whether a device is switched on/off and/or what mode the device is in), device model information etc.

The known reference signals 302, 304, 306 may be transmitted to the audio processing apparatus 102 over a network using existing wireless technologies such as near field magnetic induction (NFMI), Bluetooth® (BT).

In addition to transmitting known reference signals 302, 304, 306, devices may transmit control information, such as information relating device status and/or synchronisation. Such information may enable the audio processing apparatus 102 to identify and know the status of each interconnected device. Such information may also enable the audio processing apparatus 102 to time synchronise audio signals received from the one or more microphones 104 with corresponding known reference signals 302, 304, 306 received at the audio processing apparatus via electronic transmission from interconnected devices.

Figure 4:
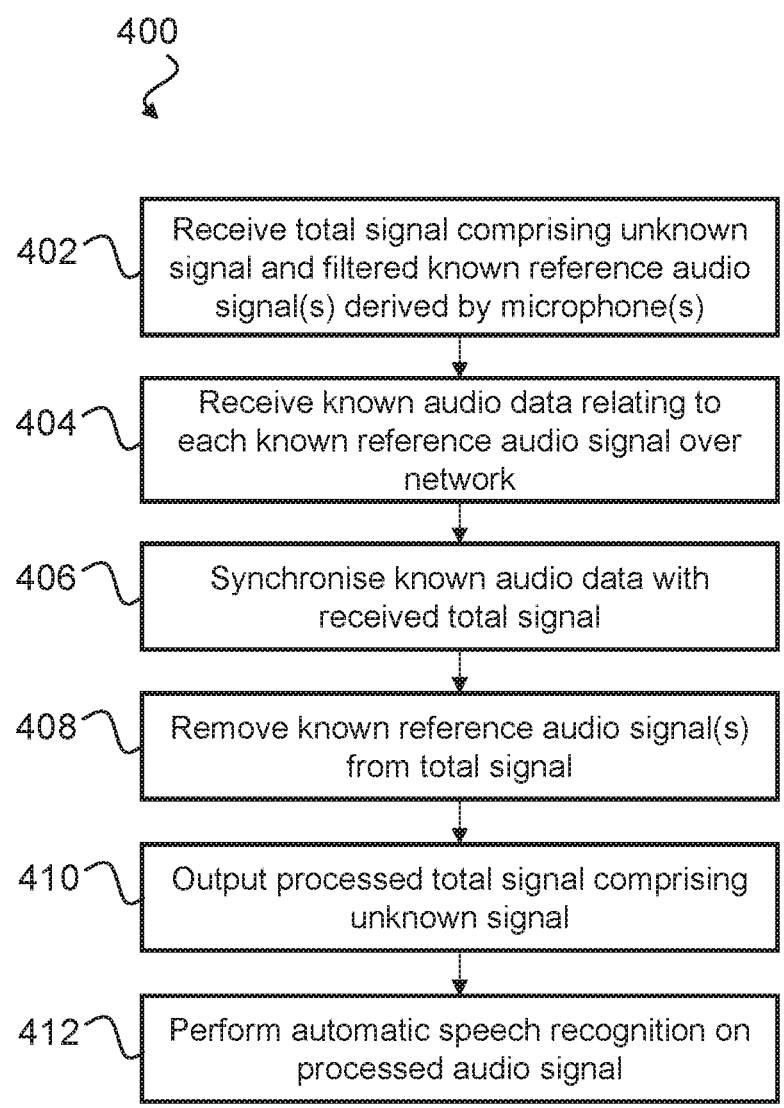
FIG. 4 is a flow diagram depicting a process which may be carried out by the audio processing apparatus.

In some embodiments, the control information may include messages for the audio processing apparatus 102. In some embodiments, the audio processing apparatus 102 may maintain a list of decoded messages from interconnected devices in the acoustic environment. Each message may include identification and status information, such as one or more of the following:

1. Unique synchronisation sequence
2. Device ID
3. Status: ON/OFF
4. Availability of audio samples
5. Interference statistics
6. ON/OFF duration A process 400 for removing noise from an audio signal received at the one or more microphones 104 by the audio processing apparatus 102, such as the total signal 316, will now be described with reference to FIGS. 1, 3 and 4. Referring first to FIG. 4, at step 402 the audio processing apparatus 102 may receive the total signal 316 derived by the microphone(s) 104 which comprises the unknown signal relating to the user's 116 speech along with one or more filtered versions of known reference audio signals which have been output from one or more of the devices 108, 110, 112, 114 depicted in FIG. 1. At step 402, the audio processing apparatus 102 may receive known audio data relating to each of the known reference audio signals over a network.

The known audio data may then optionally be synchronised at step 406 with the audio signal derived by the microphone(s) 104. Such synchronisation may occur before the process 400 begins or during the process 400 as illustrated in FIG. 4. As mentioned above, in some embodiments, interconnected devices may transmit synchronisation information so as to enable the audio processing apparatus 102 to synchronise known reference signals 302, 304, 306 containing audio streams (such as signals received from the speaker system 112 and TV 114 shown in FIG. 1) with the total signal 316.

In some embodiments, when a device, such as one of the devices 108, 110, 112, 114 shown in FIG. 1 is turned on for the first time or first initiated or connected to the audio processing apparatus 102, that device may transmit its control information to the audio processing apparatus 102. These parameters may include the unique sync sequence (referred to above) alongside a device ID relating to that device (also referred to above). The device may send this control information on a periodic basis, the period known to both the device and the audio processing apparatus 102. This information may allow the audio processing apparatus 102 to synchronise each device.

Figure 5:
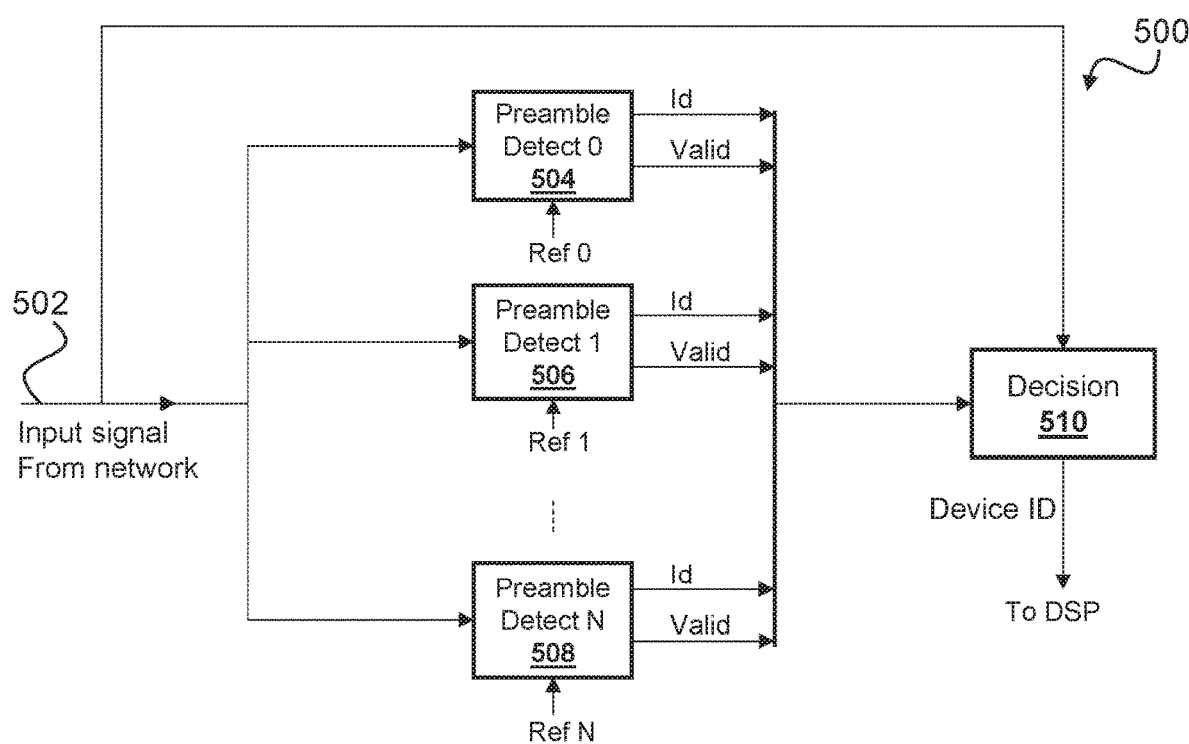
FIG. 5 is a schematic diagram of a device detecting module which may be implemented by the audio processing apparatus.

In some embodiments, signals from each of the device 108, 110, 112, 114 may be received over the network by the audio processing apparatus 102 in the same channel. In such embodiments, the control information may be included in a preamble provided in the signal generated by each device and transmitted to the audio processing apparatus 102. The audio processing apparatus 102 may then determine the identification and/or other information concerning the device based on the preamble. FIG. 5A illustrates an exemplary device detection module 500 according to some embodiments of the present disclosure which may be implemented by the audio processing apparatus 102 to process an input signal 502 received over the network. The device detection module 500 may comprise a plurality of preamble detectors 504, 506, 508 and a decision module 510. A preamble detector 504, 506, 508 may be provided for each device connected to the audio processing apparatus 102 via the network. During operation, each preamble detector may receive the input signal 502 from the network and perform a correlation between the input signal 502 and a known preamble associated with a device, such as the devices 108, 110, 112, 114. If the magnitude of the correlation exceeds a detection threshold, then the preamble detector 504, 506, 508 outputs to the decision module 510 a valid flag together with a device ID associated with device to which the preamble detector 504, 506, 508 is associated. The decision module 510 then outputs to the DSP 120 the device ID associated with the device from which the input signal 502 was received or to which the input signal 502 relates. Control information received in the preamble may also be decoded and passed to the DSP 120. The DSP 120 may then process the received signal based on the control information contained in the preamble.

Referring to step 406 above, the audio processing apparatus 102 may use correlation techniques to synchronise audio streams comprised in received known reference signals 302, 304, 306 with the total signal 316. Such techniques will be described in more detail below.

The process 400 continues at step 408, where one or more of the one or more known reference audio signals may be removed from the total signal 316 leaving a processed total signal 318. The processed total signal 318 (i.e. the audio signal having been processed to remove the one or more known reference audio signals) may then be output at step 410 to the ASR engine 118 for automatic speech recognition at step 412.

Figure 6A:
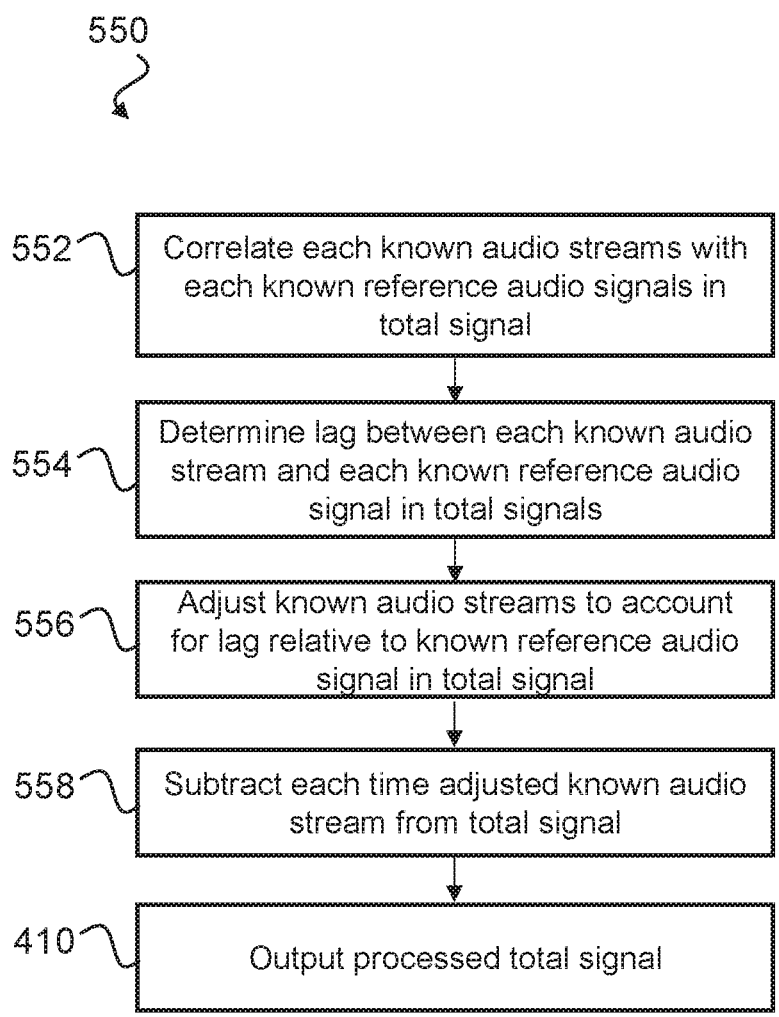
FIG. 6A is a flow diagram depicting a process which may be carried out by the audio processing apparatus.

As mentioned above, in some embodiments, the audio processing apparatus 102 may utilise correlation to synchronise audio streams comprised in received known reference signals 302, 304, 306 with the total signal 316. FIG. 6A is a flow diagram showing an exemplary process 550 performed at steps 406 and 408 of the process 400 shown in FIG. 4. At step 552, each of the known audio streams received over the network is correlated with each known reference signal in the audio signal derived from the microphone(s) and in doing so, at step 554, a delay or lag is determined between each known audio stream received over the network and each known reference audio signal in the total signal 316 received from the microphone(s) by the audio processing apparatus 102. In knowledge of the various lags between each known audio stream and the total signal 316, the process at step 556 adds or removes delay from each known audio stream to account for the delay determined at step 554 so as to align each known audio stream in time with both one another and the total signal 316. Each time adjusted signal is then subtracted at step 558 from the total signal 316 such that what is left is the unknown signal. The process then continues to step 410 shown in FIG. 4.

Figure 6B:
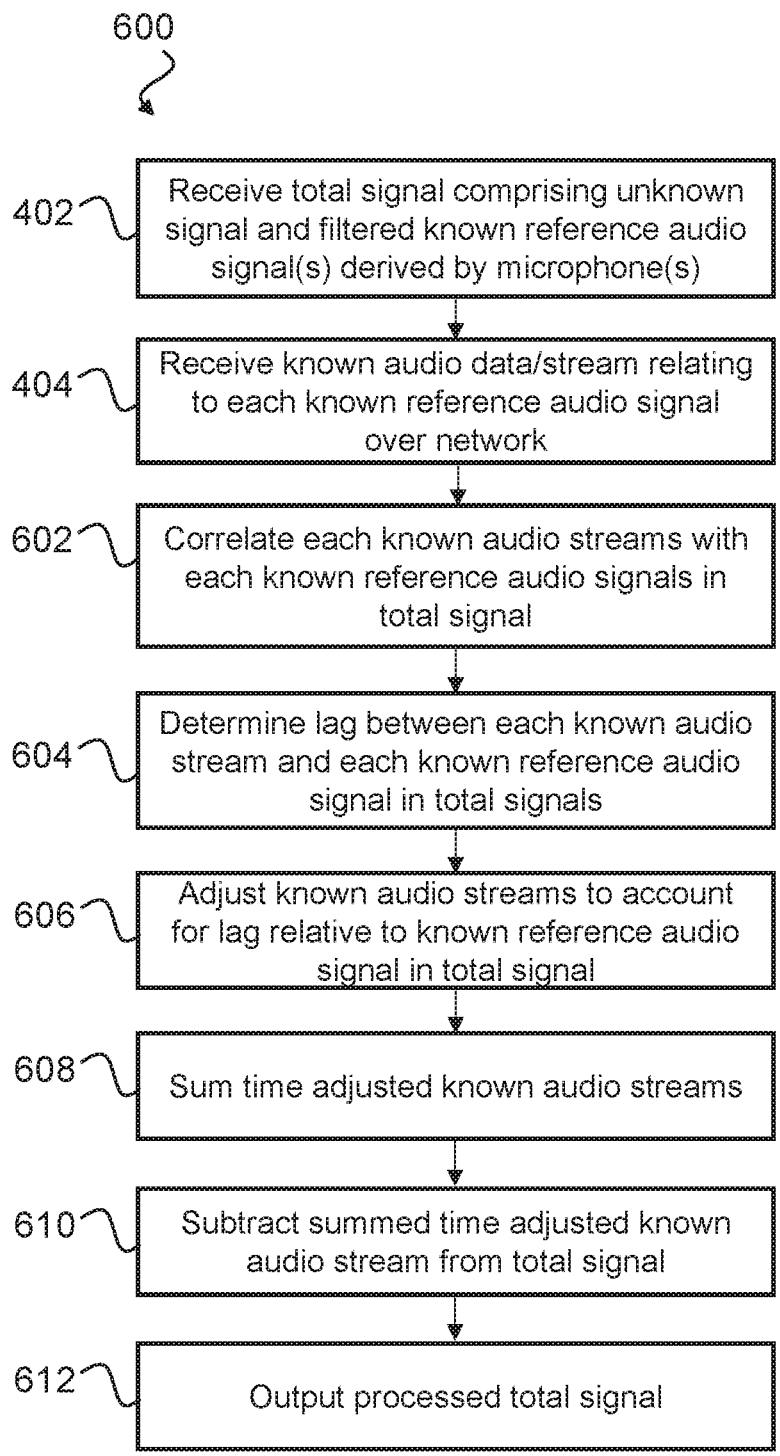
FIG. 6B is a flow diagram depicting a process which may be carried out by the audio processing apparatus.

FIG. 6B illustrates a variation of the process 400 shown in FIG. 4 and the process shown in FIG. 6A. Like the process shown in FIG. 6A, the process 600 of FIG. 6B uses correlation to account for possible lag between audio streams received over the network and the total signal 316, i.e. the audio signal derived by the microphone(s). Steps 402 and 404 mirror those of process 400. At step 602, each of the known audio streams received over the network is correlated with each known reference signal in the audio signal derived from the microphone(s) and in doing so, at step 604, a delay or lag is determined between each known audio stream received over the network and each known reference audio signal in the total signal 316 received from the microphone(s) by the audio processing apparatus 102. In knowledge of the various lags between each known audio stream and the total signal 316, the process at step 606 adds or removes delay from each known audio stream to account for the delay determined at step 604 so as to align each known audio stream in time with both one another and the total signal 316. Then, at step 608, the time adjusted known audio streams are summed together to create a composite, time aligned known audio stream. The composite, time aligned audio stream can then be used to remove all known reference audio signals from the total signal 316 received from the microphone(s) 104 at step 610. This may be achieved, for example, by subtracting the composite, time aligned audio stream from the total signal 316. The processed total signal 318 may then be output at step 612, for example to the ASR engine 118 for speech recognition.

In either of the processes 550, 600 described above with reference to FIGS. 6A and 6B, an estimation of delay or lag may be determined at steps 554 and 604 by performing fine fractional sample delay estimation or the like. Timing adjustment performed at steps 556 and 606 may and fractional and/or integer timing adjustment and may be performed using the determined delay and a Lagrange interpolation filter.

Referring again to step 408 of FIG. 4, it is noted that known reference audio signals may be removed from the audio signal using any suitable technique known in the art. For example, where a known reference audio signal is an audio (e.g. music or TV audio) stream, that audio stream may be subtracted from the audio signal derived from the microphone(s). In another example, where a known reference audio signal comprises characteristic information in relation to a washing machine having a drum spinning at a particular frequency, a bandpass filter straddling the frequency of sound output from the washing machine may be used to filter out the sound of the washing machine derived by the microphone(s) 104. Other filtering, equalization, level compression, and/or noise cancellation techniques known in the art may be used to filter out the known reference audio signals from the audio derived by the microphone(s).

It will be appreciated from the above that some techniques will be more effective than others in removing the various different types of audio signal. Accordingly, in some embodiments, the audio processing apparatus 102 may apply different techniques of noise removal depending on the type of known reference signal being removed. In some embodiments, the audio processing apparatus 102 may classify audio data relating to each of the known reference audio signals into classes and sub-classes of audio. Classes of audio may include speech, noise (from appliances and the like), and music. Sub-classes may include rock music, classical music, rap music etc. The audio processing apparatus 102 may then remove the known reference audio signal using a method most suited to its class.

In some embodiments, the order in which known reference signals 302, 304, 306 are removed from the audio signal may be prioritised. For example, the above classification may be used to prioritise the order in which known reference signals are removed. In some embodiments, the classification of the known reference signals 302, 304, 306 may include a speech comprehension index or the like which ranks each of the interfering signals in order of how detrimental their presence in the audio signal is to the process of speech recognition performed by the ASR engine 118. The speech comprehension index may take into account factors other than audio class. For example, the speech comprehension index may take into account any factor which might affect how a known reference audio signal present in the total signal 316 might impact on automatic speech recognition.

In some embodiments, the expected energy level of each known reference signal 302, 304, 306 in the audio signal derived at the microphone(s) 104 may be used to prioritise the order of removal. For example, where the energy level of a reference signal 302, 304, 306 is expected to be high, for example because a device is at high volume (e.g. TV 114 is at high volume), then removal of that interfering audio signal may be prioritised. Equally, in some embodiments, where it is desirable to reduce artefacts in the processed audio signal, lower energy reference signals may be prioritised, since removal of large audio components from the total signal 316 may result in large artefacts in the processed audio signal and vice versa.

Figure 7:
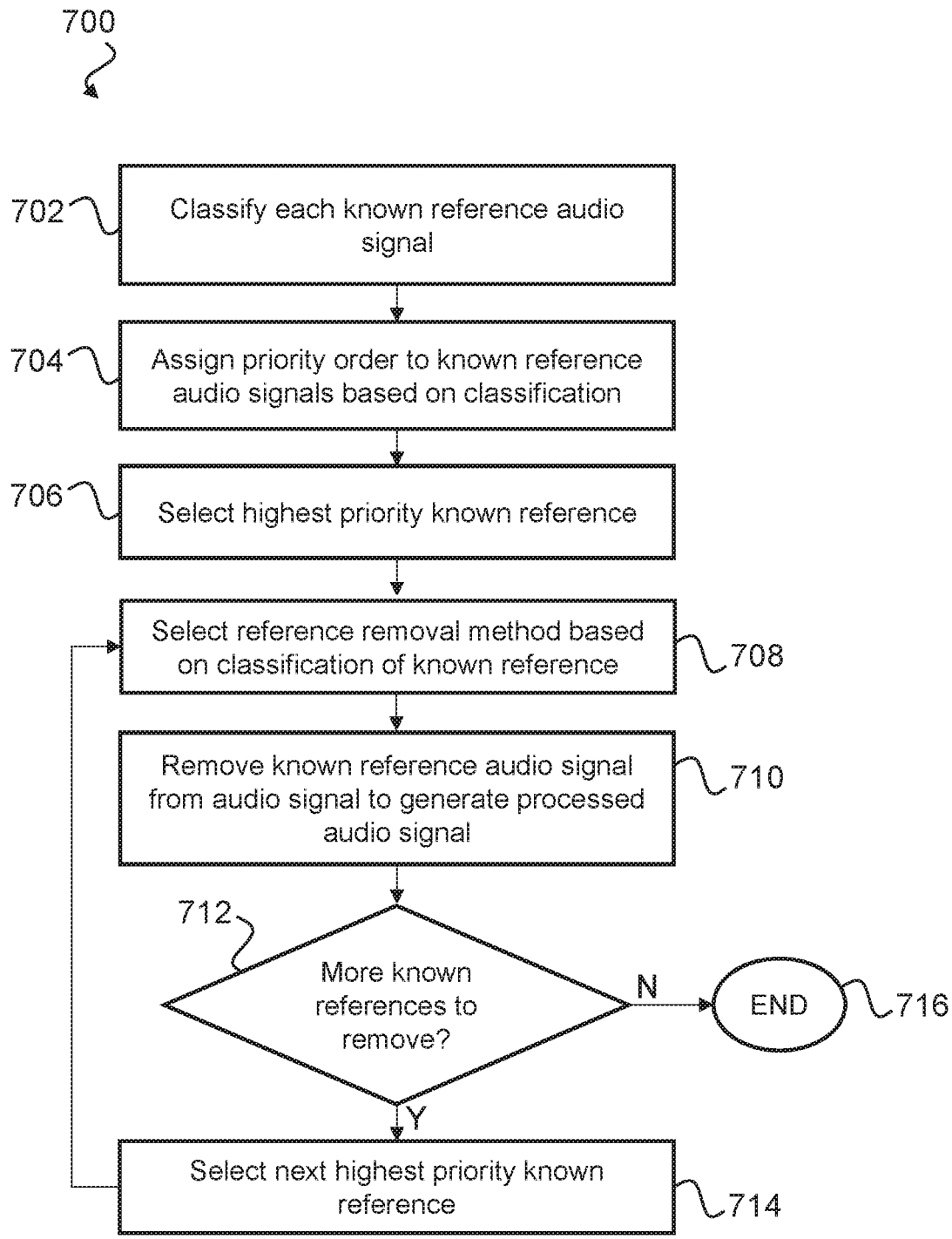
FIG. 7 is a flow diagram depicting a process which may be carried out by the audio processing apparatus.

FIG. 7 is a flow diagram illustrating an exemplary process 700 for removing known reference signals 302, 304, 306 from the total signal 316, which may be implemented at step 408 of process 400. At step 702, each known reference signal is classified into a class of audio, such as the classes listed above. At step 704, the known reference signals 302, 304, 306 are assigned an order of priority for removal based on their classification and/or other factors such as signal level, proximity to the microphone(s) etc. In some embodiments, taking into account various factors including audio class, those known reference signals deemed to have the largest detrimental effect to a speech signal being correctly interpreted by the ASR engine are assigned the highest priority. At step 706, the known reference having the highest removal priority is selected. At step 708 an appropriate removal technique is selected to processing the total signal 316 to remove the known reference signal. The total signal 316 is then processed at step 710 using the selected removal technique, and the processed total signal 318 output. At decision block 712, if additional known references are still present in the processed total signal 318, then the next highest priority reference signal is selected at step 714 and the process repeats from step 708. However, this time, the processed total signal is reprocessed at step 710 to remove the next known reference signal. Once all of the known reference signals have been removed from the audio signal, the process ends at step 716.

It will be appreciated that the above process 700 may in some instances be conducted in combination with the process 600 described with reference to FIG. 6, in which all known reference audio signals are removed simultaneously using a composite, time aligned audio stream. For example, in some embodiments, the process 600 may be used to remove all audio streams classified in the process 700 into a single class or type. In some embodiments, where the known reference signals 302, 304, 306 comprise audio streams (from media devices) as well as noise (associated with appliances) then the process 700 may classify and the known reference signals 302, 304, 306 comprising audio streams into one class and the remaining known reference signals 302, 304, 306 into other classes which may be removed at different stages. The process 600 may be used to remove two or more known reference signals 302, 304, 306 at a time independent of whether the reference signals require time aligning. For example, two audio streams may be time aligned using the process 600, and then those known reference signals relating to those two audio streams may be removed at the same time as other known reference signals which do not require time aligning (such as static noise from appliances, e.g. a refrigerator condenser).

Figure 8:
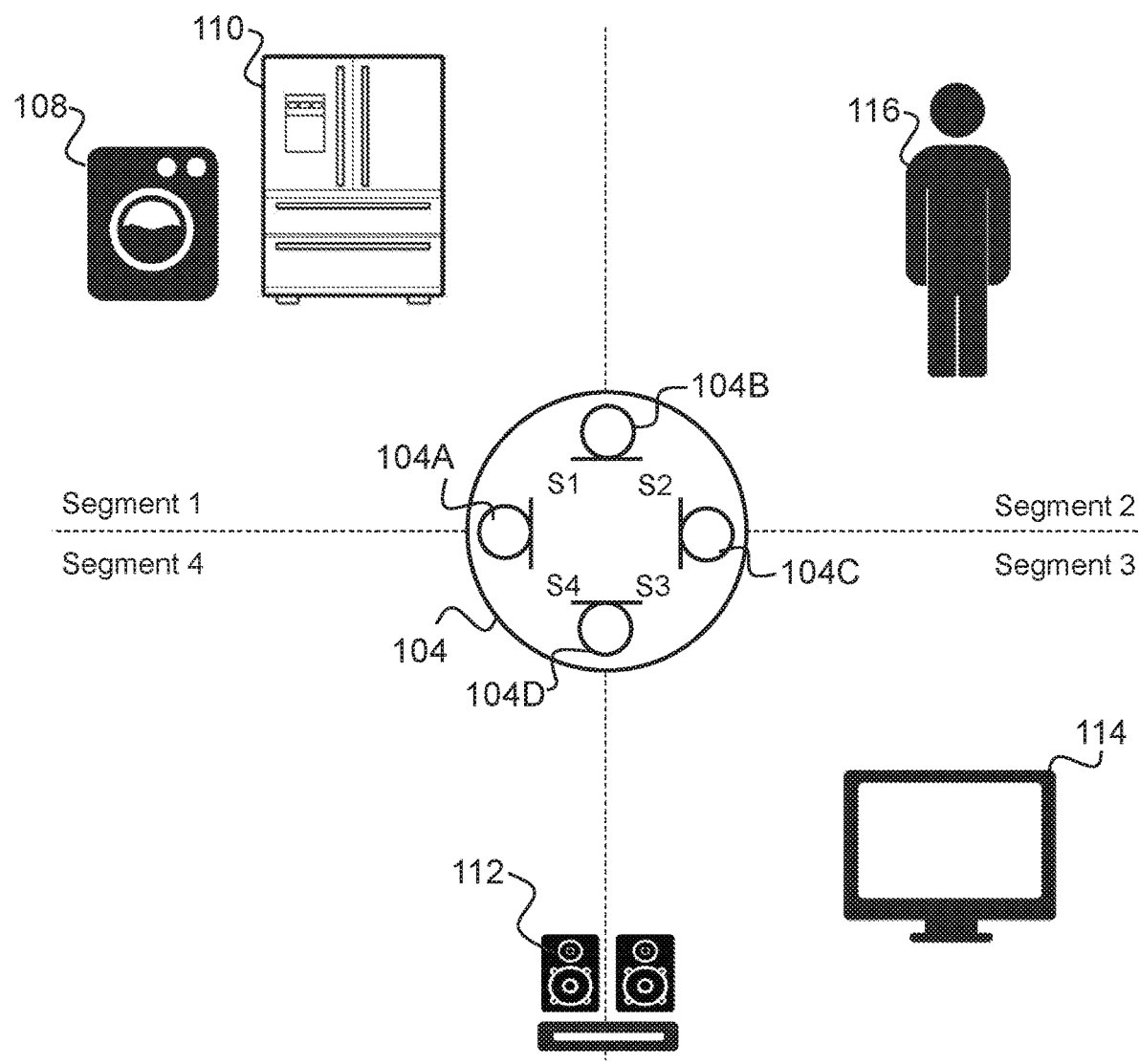
FIG. 8 is an aerial representation of the audio environment of FIG. 1 comprising a microphone unit having four microphones.

As mentioned above, the one or more microphones 104 may comprise multiple microphones. In such circumstances known beamforming techniques may be used to determine a general direction from which known reference audio signals are being broadcast. FIG. 8 is an exemplary aerial view of the audio environment 100 of FIG. 1 comprising the one or more microphones 104, the washing machine 108, the refrigerator 110, the speaker system 112, the TV 114 and the user 116. For simplicity, the audio processing apparatus 102, IOT hub 106, ASR engine 118 and any interconnections are not shown. In this example, four microphones 104A, 104B, 104C, 104D are provided in the microphone unit 104 evenly spaced around the environment 100. With this microphone arrangement comprising four microphones 104A, 104B, 104C, 104D, beamforming can be used to segment the audio environment into up to four segments (it will be appreciated that with N microphones, the audio environment can be segmented into up to N segments). The washing machine 108 and refrigerator 110 are positioned substantially within Segment 1. The user 116 is positioned in Segment 2, the TV 114 is positioned in Segment 3 and the speaker system 112 is positioned so as to straddle Segment 3 and Segment 4. The audio processing apparatus 102 may receive audio signals from each of the four microphones 104A, 104B, 104C, 104D and process such signals to derive four signals equivalent to the total signal 316 of FIG. 3, each signal for one of the four segments in the audio environment 100 (i.e. total signal S1, total signal S2, total signal S3 and total signal S4). For example, the audio processing apparatus 102 may derive a total signal for Segment 1 by combining the signal received at first and second microphones 104A, 104B. Similarly, the audio processing apparatus 102 may derive a total signal for Segment 2 by combining the signal received at the second and third microphones 104B, 104C, and so on.

The audio processing apparatus 102 may then implement any of the noise removal processes 400, 600, 700 discussed above on one or more of the four derived total signals. In some embodiments, noise removal is applied on all four derived total signals to generate four processed total signals for speech recognition. In which case, the four derived total signals may be compared to determine which contains the clearest representation of the user's 116 speech. The selected signal may then be used by the ASR engine 118 to determine what the user 116 has said. Additionally or alternatively, the ASR engine 118 may perform speech recognition on all four processed total signals. The ASR outputs for each processed total signal may then be compared or used in combination to increase confidence in an ASR result.

The audio processing apparatus 102 may also determine, based on the four total signals S1, S2, S3, S4 derived from the four microphones 104A, 104B, 104C, 104D, the location of each device 108, 110, 112, 114 in the audio environment 100. The audio processing apparatus 102 may then use different noise removal techniques on each of the four total signals S1, S2, S3, S4. For example, the audio processing apparatus 102 may determine based on the four total signals S1, S2, S3, S4 that the washing machine 108 and refrigerator are in Segment 1. In which case, a low pass or band pass filter may be applied to the segment 1 total signal S1 to remove the band associated with the sound output from each of the washing machine 108 and the refrigerator.

In some embodiments, the audio processing apparatus 102 may determine that the user 116 is position in Segment 2. In which case, the audio processing apparatus 102 may choose the segment 2 total signal S2 to further process and pass to the ASR engine 118. Total signals S1, S3 from nearby segments, in this case segment 1 and 3 may then be used to increase confidence in an ASR result from the segment 2 total signal S2.

In some embodiments, analysis may be performed over an extended time duration to which segments particular known reference signals tend to originate from. For example, in FIG. 8, the washing machine 108, refrigerator 110 and TV 114 are unlikely to move and thus the segment from which their audio signals originate will not change over time. This relies either on the position of the microphones 104 being fixed in space over time or knowledge of the position of each microphone 104 in the room over time. To that end, the microphone unit 104 may be provided with tracking means (accelerometer, GPS, compass and/or the like) to enable the audio processing apparatus 102 (or communicating peripheral device) to keep track of the positions of the microphones 104A, 104B, 104C, 104D relative to the audio environment 100.

Whilst the above embodiments have been described with reference to four segments, it will be appreciated that the methods described can be applied to any number of segments, i.e. N segments. Additionally, whilst the above embodiments have been described in relation to the audio environment 100 shown in FIGS. 1 and 8, it will be appreciated that embodiments of the present disclosure are not limited to this environment 100.

Figure 9:
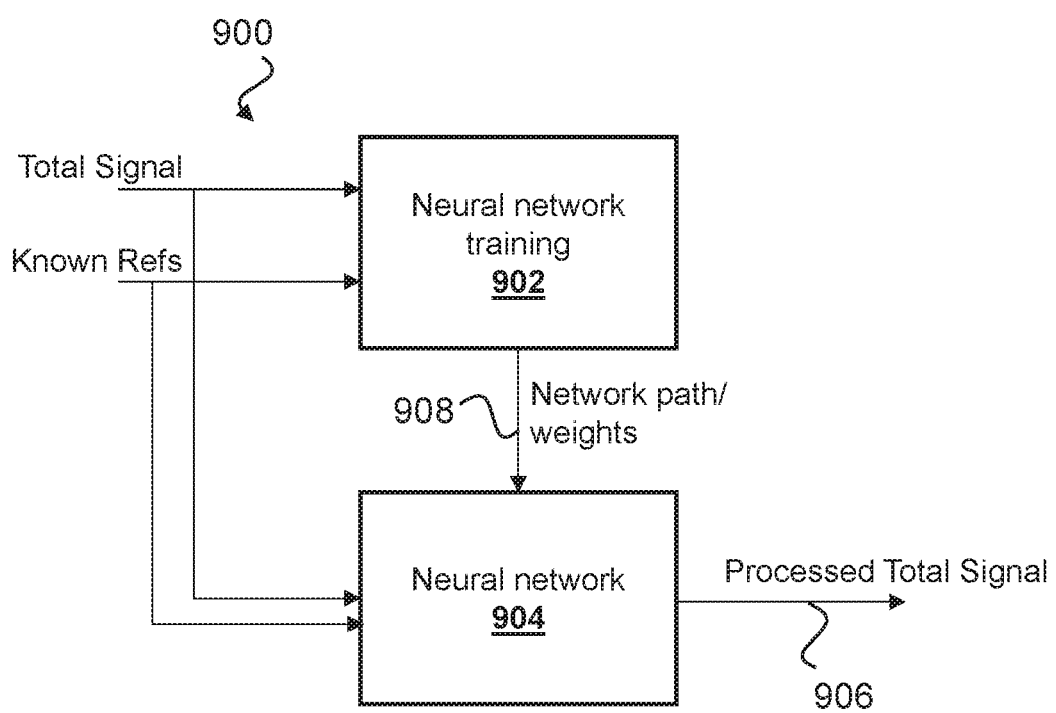
FIG. 9 is a block diagram of a neural network system.

It will be appreciated that any particular audio environment, such as the home environment 100 shown in FIG. 1 and the car environment 200 shown in FIG. 2, will have a set of unique characteristics, different to the characteristics of any other environment. Additionally, it is likely that such characteristics of the audio environment will be constantly changing over time. Accordingly, the inventors have realised that embodiments of the present invention can utilise neural networks to process audio signals, such as the total signal 316 to remove noise associated with interfering known reference audio signals. FIG. 9 is a block diagram of an example neural network system 900 which may be implemented by the audio processing apparatus 102. The neural network system 900 comprises a neural network training module 902 and a neural network 904. Referring to FIGS. 3 and 9, the neural network module 902 and the neural network 904 may each receive the total signal 316 from the one or more microphones 104 and the known reference signals 302, 304, 306 from the audio sources, e.g. devices 108, 110, 112, 114. The neural network 904 may then be trained to process the total signal 316 and the known reference signals 302, 304, 306 in the audio environment 100 to remove the known reference signals 302, 304, 306 from the total signal 316, outputting the processed total signal or unknown signal 906 for subsequent automatic speech recognition. The neural network training module 902 may use the total signal 316 and the known reference signals 302, 304, 306 to continuously generate updated network path information and/or network weights 908 and output these to the neural network 904 to update the neural network 904 in response to changes in the audio environment.

It will be appreciated that training of neural networks can be computationally intensive. Accordingly, the above neural network system 900 may be implemented using the combination of a local, less complex computational system implemented, for example, by the audio processing apparatus 102 and a remote, more complex computational system implemented, for example, remote from the audio processing apparatus 102. In some embodiments, the remote, more complex computational system may be implemented in the cloud.

By implementing the neural network training mechanism across local and remote systems, the remote system can store training history of the neural networks and provide a neural network to the local system which is trained on information derive from scenarios that the local system may encounter. This allows the local neural network to be trained and adapt to changes that occur in the specific audio environment whilst performing the majority of the computationally intensive tasks remote from the local system.

Figure 10:
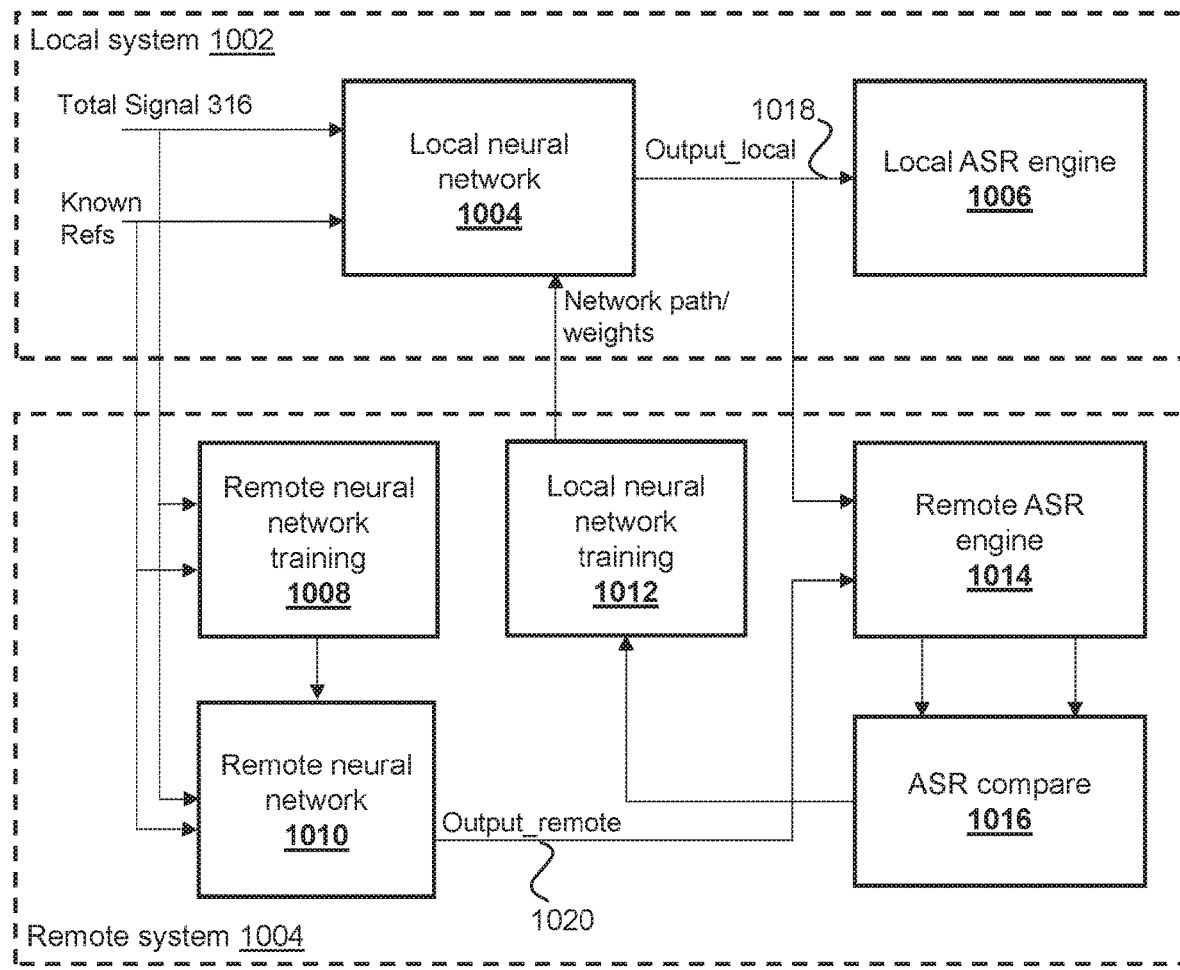
FIG. 10 block diagram of a neural network architecture distributed over a local system and a remote system.

FIG. 10 is a schematic diagram of an example neural network architecture 1000 distributed between a local system 1002 and a remote system 1004. In this architecture 1000, all of the computationally intensive neural network training is performed on the remote system 1004 and the network paths/weights downloaded to the local system 1002 if and when required to update a local neural network 1004. The local system comprises a local neural network 1004 which may be coupled to a local ASR engine 1006 similar to the ASR engine 118 described above with reference to FIGS. 1 to 3. The remote system comprises a remote neural network training module 1008, a remote neural network 1010, a local neural network training module 1012 for training the local neural network 1004 located in the local system 1002, a remote ASR engine 1014 and an ASR compare module 1016. Like the neural network 904 of FIG. 9, the neural network 1004 may be trained to process the total signal 316 and the known reference signals 302, 304, 306 to remove the known reference signals 302, 304, 306 from the total signal 316, outputting a processed total signal (output_local signal 1018) for subsequent automatic speech recognition by the local ASR engine 1006. This signal, output_local signal 1018, is also uploaded to the remote system 1004 via any suitable means, e.g. over the internet, and provided to the remote ASR engine 1014 for automatic speech recognition at the remote system 1004.

In addition, the remote neural network training module 1008 and the remote neural network 1010 may each receive the total signal 316 and the known reference signals 302, 304, 306 from the audio sources, e.g. devices 108, 110, 112, 114. These signals may be uploaded to the remote system 1004 via any suitable means, e.g. over the internet. The remote neural network 1010 may similarly be configured to process the total signal 316 and the known reference signals 302, 304, 306 to remove the known reference signals 302, 304, 306 from the total signal 316, outputting a processed total signal (output_remote 1020) for subsequent automatic speech recognition by the remote ASR engine 1014.

Figure 11:
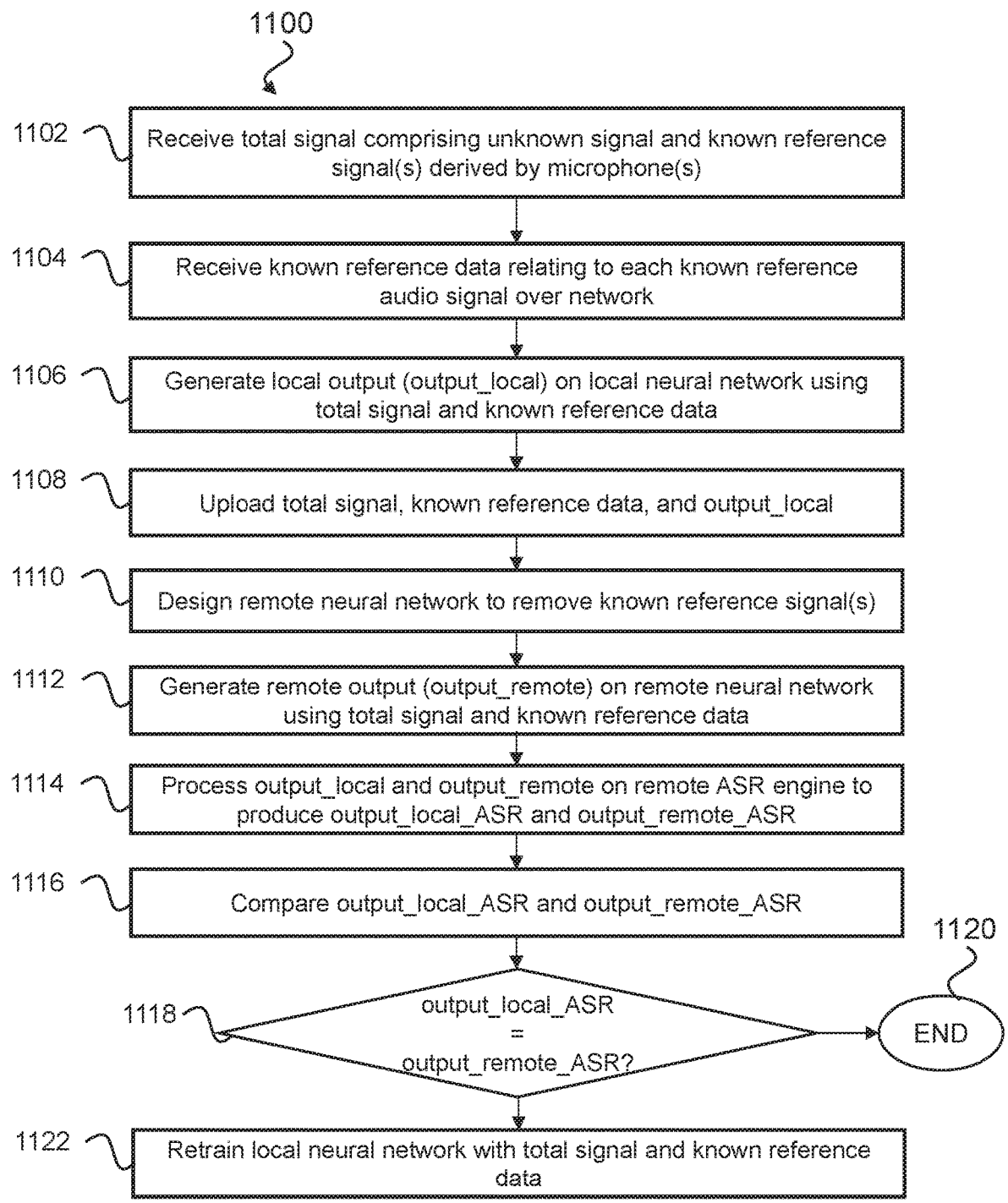
FIG. 11 is a flow diagram depicted a process which may be carried out by the audio processing apparatus.

Operation of the network architecture 1000 shown in FIG. 10 will now be described with reference to FIG. 11 which depicts a process 1100 for updating the local neural network 1004. At steps 1102 and 1104, the total signal and known reference signals 302, 304, 306 are received both at the local system 1002 and the remote system 1004. The known reference signals 302, 304, 306 may be transmitted universally about the local and remote systems 1002, 1004. For example, each device 108, 110, 112, 114 may transmit data (audio streams, control information etc.) to the cloud in realtime and such data may be downloaded by the local and/or remote systems 1002. At step 1106 the local neural network 1004 generates the local output signal, output_local 1018 using the total signal 316 and known reference signals 302, 304, 306 as inputs to the local neural network 1004. At step 1108, local output signal, output_local 1018 (and optionally the total signal 316 and known reference signals 302, 304, 306 if not accessible to the remote system 1004) are uploaded to the remote system 1004. At step 1110, the remote neural network 1010 is then designed and trained by the remote neural network training module 1008 using the total signal 316 and the known reference signals 302, 304, 306 which are also provided as inputs to the remote neural network 1010. The remote neural network 1010 in turn generates a remote output signal, output_remote 1020 at step 1112 and the output_local signal 1018 and output_remote signal 1020 are then provided to the remote ASR engine 1014 for speech recognition. The ASR engine 1014 produces two speech results, output_local_ASR and output_remote_ASR based on the output_local signal 1018 and output_remote signal 1020 respectively at step 1114 and these results are compared at step 1116. If no difference is found between the two results at step 1118, then the process ends at block 1120. If a difference is found between the two results at step 1118, then this result is output to the local neural network training module 1012 which generates new network paths and/or weights for the local neural network 1004 based on the total signal 316 and known reference signals 302, 304, 306 which cases the difference in ASR results.

Although not shown, the architecture 1000 shown in FIG. 10 may be further modified to provide training for the local ASR engine 1006. For example, the output of the local ASR engine 1006, output_local_ASR_local, may optionally be uploaded to the remote system 1004 and compared by the ASR compare module 1016 with the output, output_local_ASR, from the remote ASR engine 1014. Then, if a discrepancy exists between the output of the local and remote ASR engines 1006, 1014, the local ASR engine may be retrained using the output_local 1018 (i.e. the input to the local ASR engine 1006) and output_remote_ASR are training data for the local ASR engine 1006.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

The invention claimed is:

1. An audio processing apparatus, comprising:
a first receiver configured to receive one or more audio signals derived from one or more microphones, the one or more audio signals comprising a speech component received from a user and a first noise component transmitted by a first device;
a second receiver configured to receive over a network and from the first device, first audio data corresponding to the first noise component;
one or more processors configured to:
remove the first noise component from the one or more audio signals using the first audio data to generate a first processed audio signal; and
perform speech recognition on the first processed audio signal to generate a first speech result.

2. The audio processing apparatus of claim 1, wherein:
the one or more audio signals further comprises a second noise component transmitted by a second device;
the receiver is configured to receive over the network and from a second device, second audio data corresponding to the second noise component; and
the processor is configured to remove the second noise component from the one or more audio signals using the second audio data to generate the first processed audio signal.

3. The audio processing apparatus of claim 2, wherein the processor is configured to:
prioritise removal of one of the first noise component and the second noise component from the one or more audio signals.

4. The audio processing apparatus of claim 3, wherein the processor is configured to:
determine a first audio class of the first audio data; and
determine a technique for removing the first noise component based on the determined first audio class; and
remove the first noise component from the one or more audio signals using the determined technique.

5. The audio processing apparatus of claim 1, wherein the one or more processors is further configured to:
time synchronise the one or more audio signals with the first audio data.

6. The audio processing apparatus of claim 1, wherein the at least one microphone comprises two or more microphones, wherein the one or more audio signals comprises two or more audio signals, and wherein the one or more processors is further configured to:
generate a plurality of spatially filtered audio signals using the two or more audio signals, each of the plurality of spatially filtered audio signals representing a spatial sector around the audio processing apparatus;
identify the speech component in one of the spatially filtered audio signals;
generate the first processed audio signal by removing the first noise component from the spatially filtered audio signal containing the speech component.

7. The audio processing apparatus of claim 1, wherein the one or more processors is configured to:
generate the first processed audio signal using a local neural network; and
train the local neural network using the first audio data and the one or more audio signals.

8. An audio processing system comprising:
the audio processing apparatus of claim 7; and
a remote neural network configured to:
remove the first noise component from the one or more audio signals using the first audio data to generate a second processed audio signal using a remote neural network;
compare the first processed audio signal to the second processed audio signal;
if the first processed audio signal and the second processed audio signal are different, retrain the local neural network using the first audio data and the one or more audio signals to provide an updated local neural network; and
send the updated local neural network to the audio processing apparatus.

9. An electronic device comprising the audio processing apparatus of claim 1.

10. The electronic device of claim 9, wherein the electronic device is one of a mobile phone, for example a smartphone; a media playback device, for example an audio player; or a mobile computing platform, for example a laptop or tablet computer.

11. An audio processing method, comprising:
receiving one or more audio signals derived from one or more microphones, the one or more audio signals comprising a speech component received from a user and a first noise component transmitted by a first device;

receiving over a network and from the first device, first audio data corresponding to the first noise component;

removing the first noise component from the one or more audio signals using the first audio data to generate a first processed audio signal; and performing speech recognition on the first processed audio signal to generate a first speech result.

12. The audio processing method of claim 11, wherein:

the one or more audio signals further comprises a second noise component transmitted by a second device; and wherein the method further comprises:

receiving over the network and from a second device, second audio data corresponding to the second noise component; and removing the second noise component from the one or more audio signals using the second audio data to generate the first processed audio signal.

13. The audio processing method of claim 12, further comprising:

prioritising removal of one of the first noise component and the second noise component from the one or more audio signals.

14. The audio processing method of claim 13, further comprising:

determining a first audio class of the first audio data; and determining a technique for removing the first noise component based on the determined first audio class; and removing the first noise component from the one or more audio signals using the determined technique.

15. The audio processing method of claim 11, further comprising:

time synchronising the one or more audio signals with the first audio data.

16. The audio processing method of claim 11, wherein the at least one microphone comprises two or more microphones, wherein the one or more audio signals comprises two or more audio signals, and wherein the method further comprises:

generating a plurality of spatially filtered audio signals using the two or more audio signals, each of the plurality of spatially filtered audio signals representing a spatial sector around the audio processing apparatus;

identifying the speech component in one of the spatially filtered audio signals;

generating the first processed audio signal by removing the first noise component from the spatially filtered audio signal containing the speech component.

17. The audio processing method of claim 11, further comprising:

generating the first processed audio signal using a local neural network; and training the local neural network using the first audio data and the one or more audio signals.

18. The audio processing method of claim 17, further comprising:

at a remote neural network:

removing the first noise component from the one or more audio signals using the first audio data to generate a second processed audio signal using a remote neural network;

comparing the first processed audio signal to the second processed audio signal; and if the first processed audio signal and the second processed audio signal are different:

retraining the local neural network using the first audio data and the one or more audio signals.

19. A non-transitory computer-readable storage medium comprising instructions which, when executed by at least one processor, cause the at least one processor to carry out a method, comprising:

receiving one or more audio signals derived from one or more microphones, the one or more audio signals comprising a speech component received from a user and a first noise component transmitted by a first device;

receiving over a network and from the first device, first audio data corresponding to the first noise component;

removing the first noise component from the one or more audio signals using the first audio data to generate a first processed audio signal; and performing speech recognition on the first processed audio signal to generate a first speech result.

* * * * *